(12) United States Patent
McCoy

(10) Patent No.: US 7,445,022 B2
(45) Date of Patent: Nov. 4, 2008

(54) AIR ADMITTANCE VENT DIAPHRAGM ASSEMBLY

(75) Inventor: Daniel L. McCoy, Pasadena, CA (US)

(73) Assignee: Ayrlett Air Valve Company, LLC, Nampa, ID (US)

( * ) Notice: Subject to any disclaimer, the term of this patent is extended or adjusted under 35 U.S.C. 154(b) by 513 days.

(21) Appl. No.: 11/039,502

(22) Filed: Jan. 18, 2005

(65) Prior Publication Data

US 2006/0157118 A1 Jul. 20, 2006

(51) Int. Cl.
*F16K 24/04* (2006.01)
*E03C 1/122* (2006.01)
*E03C 1/295* (2006.01)

(52) U.S. Cl. .................... 137/526; 137/533.31; 251/357
(58) Field of Classification Search ................. 137/526, 137/533.21, 533.31; 251/357
See application file for complete search history.

(56) References Cited

U.S. PATENT DOCUMENTS

| | | | |
|---|---|---|---|
| 59,364 A | 11/1866 | Conant et al. | |
| 485,984 A * | 11/1892 | Randall | 251/357 |
| 953,330 A * | 3/1910 | Gordon, Jr. | 137/526 |
| 1,485,508 A * | 3/1924 | Kiley | 251/357 |
| 1,608,379 A * | 11/1926 | Ewald | 251/357 |
| 2,074,329 A | 3/1937 | Gieseman | |
| 2,621,017 A * | 12/1952 | Yohpe | 137/533.21 |
| 2,732,856 A * | 1/1956 | Jurs et al. | 137/526 |
| 2,807,277 A | 9/1957 | Bailey et al. | |
| 3,145,724 A | 8/1964 | Pelzer | |
| 3,394,732 A * | 7/1968 | Lisciani | 137/533.21 |
| 3,542,059 A | 11/1970 | Blanchard | |
| 4,181,146 A | 1/1980 | Goglio | |
| 4,266,568 A | 5/1981 | Kuykendall | |
| 4,379,470 A | 4/1983 | Reutter | |
| 4,414,997 A | 11/1983 | Jacobson et al. | |
| 4,502,502 A | 3/1985 | Krug | |
| 4,513,784 A | 4/1985 | Farrand et al. | |
| 4,556,084 A | 12/1985 | Frawley | |
| 4,665,943 A | 5/1987 | Medvick et al. | |
| 4,683,910 A | 8/1987 | Benson et al. | |

(Continued)

FOREIGN PATENT DOCUMENTS

DE 969650 6/1958

(Continued)

OTHER PUBLICATIONS

Packaging for Studio® Mini-Vent® Air Admittance Valve, Studio®, Inc. Inventive Technology, 2030 Main Street, Dunedin, Florida 34698, circa 1996, two sides packaging.

(Continued)

*Primary Examiner*—John Rivell
(74) *Attorney, Agent, or Firm*—Foley & Lardner LLP

(57) ABSTRACT

An air admittance vent diaphragm assembly is disclosed. The assembly comprises a base, an annular retainer ring, and an annular malleable washer. The base has an annular portion and a stem extending orthogonally from the center of the annular portion. The annular retainer ring includes a circumferential skirt engaged with an outer perimeter of the annular portion of the base, with the stem extending beyond the annular retainer ring. The annular malleable washer is disposed between the annular retainer ring and the annular portion of the base.

20 Claims, 3 Drawing Sheets

U.S. PATENT DOCUMENTS

| | | |
|---|---|---|
| 4,962,548 A | 10/1990 | vanDeventer et al. |
| 4,991,623 A | 2/1991 | Ericson |
| 5,048,560 A * | 9/1991 | Jannotta et al. ........ 137/533.31 |
| 5,067,449 A | 11/1991 | Bonde |
| 5,129,426 A | 7/1992 | Boehmer |
| 5,273,068 A | 12/1993 | Duren |
| 5,419,366 A | 5/1995 | Johnston |
| 5,520,522 A | 5/1996 | Rathore et al. |
| 5,803,112 A * | 9/1998 | Andersson .................. 137/526 |
| 5,897,305 A | 4/1999 | Roddis |
| 5,996,563 A | 12/1999 | Liao |
| 6,308,731 B1 | 10/2001 | Kawasaki |
| 6,666,663 B2 * | 12/2003 | Lee et al. ................ 137/533.31 |

FOREIGN PATENT DOCUMENTS

| | | |
|---|---|---|
| DE | 3036448 A1 | 4/1981 |
| GB | 901978 | 7/1962 |
| GB | 1302631 | 10/1973 |
| GB | 2059289 A | 4/1981 |
| GB | 2088023 A | 6/1982 |
| GB | 2124344 A | 2/1984 |
| ZA | 90/5617 | 6/1992 |
| ZA | 93/5425 | 7/1993 |

OTHER PUBLICATIONS

*International Search Report.*

* cited by examiner

US 7,445,022 B2

AIR ADMITTANCE VENT DIAPHRAGM ASSEMBLY

BACKGROUND OF THE INVENTION

1. Field of the Invention

The field of the present invention is pressure equalization mechanisms for plumbing, disposal, and waste systems.

2. Background

The plumbing, disposal, and waste system (PDWS) of most residential and commercial buildings, such as those associated with sinks, bathtubs, and toilets, require mechanisms to equalize pressure between the PDWS and the ambient atmosphere when the pressure in the PDWS is less than atmospheric pressure. Pressure equalization is necessary to maintain the liquid trap seal employed in the most common PDWS.

Traditionally, external ventilation stacks have been used to vent the PDWS to building exteriors, thereby allowing the pressure within a PDWS to constantly equalize to atmospheric pressure. More recently, air admittance vents (AAV) have replaced ventilation stacks. AAVs allow air to enter the PDWS and restrict air from flowing out of the PDWS. By restricting flow (which may include air, gases, and liquid waste) out of the PDWS, an AAV may be placed most anywhere within a building while still preventing negative pressure, i.e., less than atmospheric pressure, to build up within the PDWS.

In order to achieve the desired functionality, an AAV requires a valve that can be responsive to small drops in pressure (less than 1/100 PSI) below atmospheric pressure. The valve also needs to be able to create a good seal in response to small increases in pressure within PDWS being regulated. Finally, the preferred AAV will have a wide range of operating temperatures and will be inert to chemicals that are commonly found in a PDWS, most especially methane gas and water vapor.

SUMMARY OF THE INVENTION

The present invention is directed toward an air admittance vent diaphragm assembly. The diaphragm assembly chiefly comprises a base, an annular retainer ring, and an annular malleable washer. The base has an annular portion and a stem extending orthogonally from the center of the orthogonal portion. The annular retainer ring engages the annular portion of the base. The annular malleable washer is disposed between the annular retainer ring and the annular portion of the base.

In a first separate aspect of the present invention, the annular retainer ring includes a circumferential skirt which engages the base about the outer perimeter of the annular portion. The circumferential skirt may include a raised lip, and the outer perimeter of the annular portion may include a beveled edge to engage the raised lip of the circumferential skirt.

In a second separate aspect of the present invention, the annular portion of the base includes a first circumferential ridge and the side of the annular retainer ring facing the annular portion includes a second circumferential ridge. Optionally, the first and second circumferential ridges have different radii.

In a third separate aspect of the present invention, the annular portion of the base includes a stepped surface. This stepped surface may include two or more steps. In the two step configuration, the outer step is disposed nearer to the annular retainer ring than the inner step.

In a fourth separate aspect of the present invention, the stem has a cross-section that is substantially X-shaped.

In a fifth separate aspect of the present invention, any of the foregoing aspects may be employed in combination.

Accordingly, the present invention provides an improved air admittance vent diaphragm assembly. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENT

Figure 1:
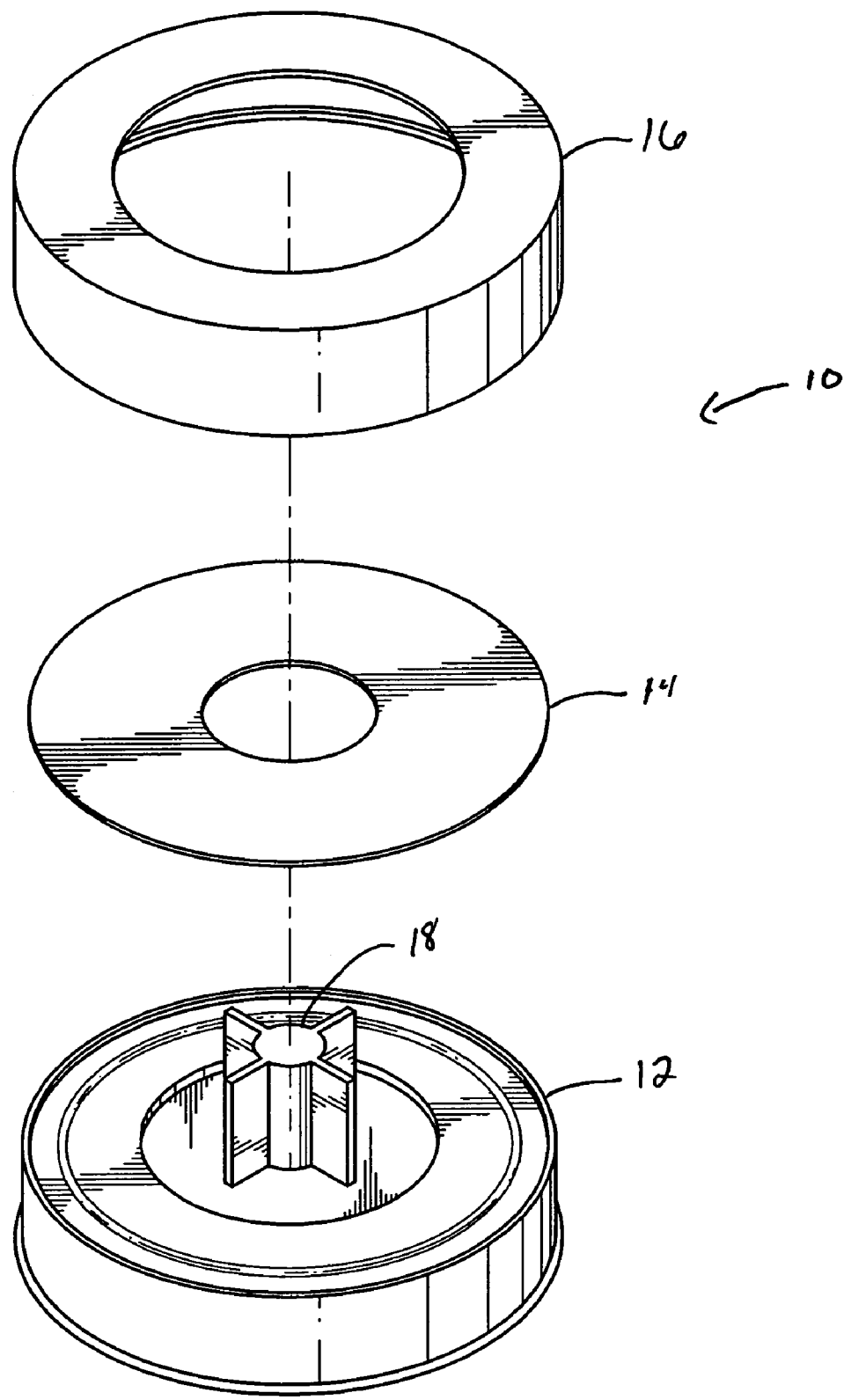
FIG. 1 is an exploded view of an air admittance vent diaphragm assembly.

Turning in detail to the drawings, FIG. 1 illustrates an exploded view of an air admittance vent diaphragm assembly 10. The diaphragm assembly 10 has three primary components: a base 12, an annular malleable washer 14, and an annular retainer ring 16. The annular retainer ring 16 is placed over the base with the annular washer disposed between the base 12 and the annular retainer ring 16. The annular retainer ring 16 is in a snap-fitting engagement with the base 12. The stem 18 extends through the center of the annular washer 14 and the annular retainer ring 16.

The annular washer 14 provides the sealing surface for the diaphragm assembly 10 and is preferably constructed from a malleable neoprene or silicon material. Other materials, however, may also be used. In choosing an appropriate material, flexibility and inertness to certain chemicals, particularly methane gas and water vapor, should be considered. Similarly, the base and the annular retainer ring are constructed from materials chosen to be inert to such chemicals. The base is preferably made out of a hard shore ABS material and the annular retainer ring is preferably constructed from polyethylene, although other materials may also be used.

Figure 2:
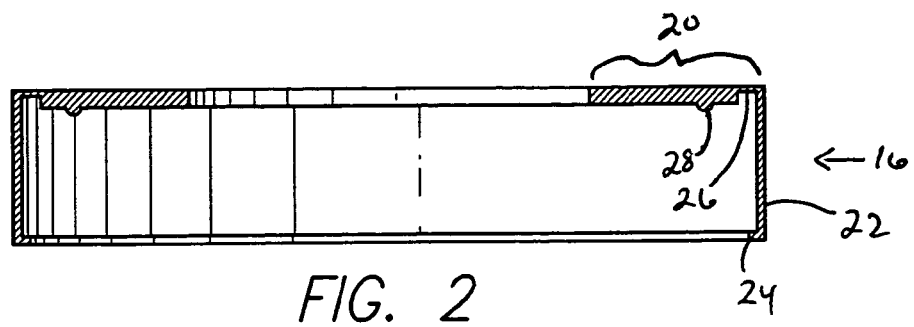
FIG. 2 is a cross-sectional view of an annular retainer ring for the diaphragm assembly of FIG. 1.

Referring to FIG. 2, the annular retainer ring 16 includes an annular portion 20 and a circumferential skirt 22. One end of the circumferential skirt 22 includes a raised lip 24 which is employed to create the snap-fit with the base as described below. The side of the annular portion 20 facing the base, when the base and the annular retainer ring 16 are engaged, includes a circumferential notch 26 and a circumferential ridge 28. The circumferential notch 26 is positioned to receive a complementary rim on the perimeter of the base. The circumferential ridge 28 is positioned to engage and apply pressure to the annular washer 14 when the diaphragm assembly is assembled.

Figure 3:
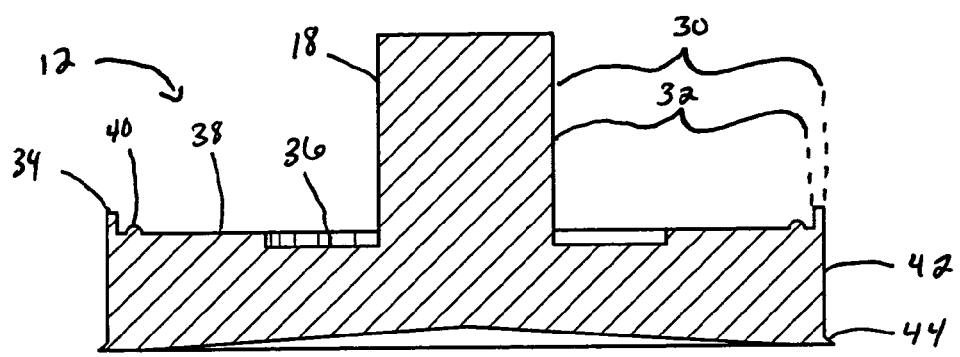
FIG. 3 is a cross-sectional view of a base for the diaphragm assembly of FIG. 1.

The base 12 of the diaphragm assembly, illustrated in FIG. 3, includes the stem 18 extending orthogonally from the center of an annular portion 30. The annular portion 30 includes a stepped surface 32 and a raised circumferential rim 34 around the stepped surface 32. The side wall 42 of the base 12 generally defines the outer perimeter of the annular portion 30. This side wall 42 includes a beveled edge 44 which is positioned to mutually engage the lip (24 in FIG. 2) of the annular retainer ring. The stepped surface 32 includes an inner step 36 and an outer step 38. A circumferential ridge 40 is disposed around the outer step 38. This circumferential ridge 40 is positioned to engage and apply pressure to the annular washer when the diaphragm assembly is assembled.

Figure 4:
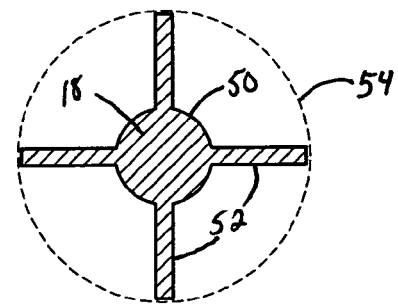
FIG. 4 is a lateral cross-sectional view of the base stem for the diaphragm assembly of FIG. 1.

A lateral cross section of the stem 18 is illustrated in FIG. 4. The stem 18 has a central core 50 and four legs 52 extending therefrom, with a pair of legs 52 lying along each orthogonal axis, thus providing the stem 18 with a cross section that is substantially X-shaped. The dotted line 54 circumscribed about the cross section of the stem illustrates the overall circumference of the stem 18 and generally represents the air admittance vent opening into which the stem is inserted during use of the diaphragm assembly. The X-shaped form of the stem 18 provides additional volume through which air may flow, thus providing increased air flow through the vent opening when the diaphragm assembly is in use. Furthermore, the X-shaped cross section of the stem 18 allows the effective circumference of the stem 18 to be maximized within the air admittance vent opening to limit lateral movement of the diaphragm assembly and help create a consistent seal during use.

Figure 5:
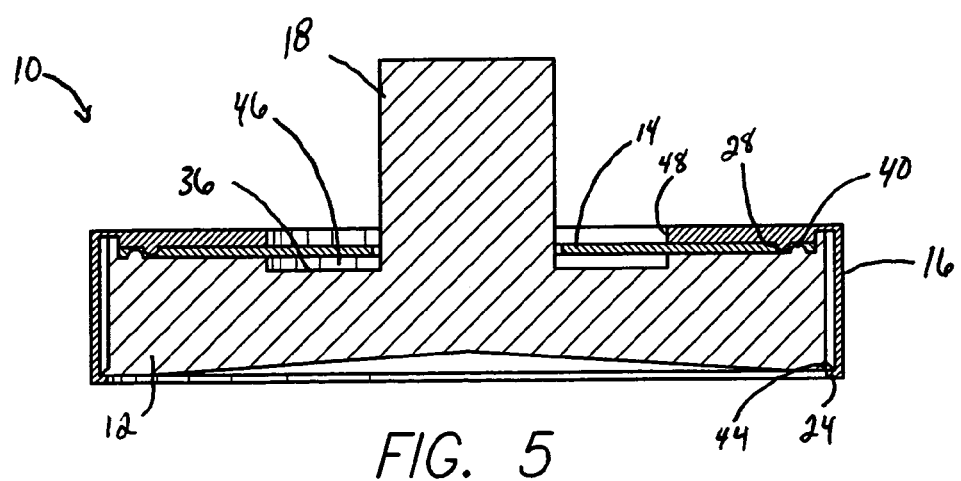
FIG. 5 is a cross-sectional view of the air admittance vent diaphragm assembly of FIG. 1.

Referring to FIG. 5, which is a cross-sectional view of the full diaphragm assembly, the raised lip 24 on the circumferential skirt 22 is shown engaging the beveled edge 44 of the base 12. This configuration permits the annular retainer ring 16 to have a snap fit with the base 12 and disposes of the need for any glues or adhesives.

The annular washer 14 is engaged with and deformed by the circumferential ridges 28, 40 of the annular retainer ring 16 and the base 12, respectively. The annular washer 14 extends from approximately the circumferential rim 34 to near the stem 18. Note that in the figures the size of the two circumferential ridges 28, 40 is exaggerated for illustration purposes. As a result, actual deformation of the washer is not illustrated in FIG. 5. In practice, each circumferential ridge is proportioned to achieve a seal as described above, such being largely a matter of design choice. The two circumferential ridges 28, 40 preferably have different radii, the difference of which may be as little as 2/1,000 of an inch. The difference in the radii of the two circumferential ridges 28, 40 is generally a matter of design choice, which may be informed by the materials used for and the overall thickness of the annular washer 14. The deformation of the washer by the circumferential ridges 28, 40 provides an airtight seal between the three components of the diaphragm assembly 10.

When assembled, the inner step 36 of the base 12 is further away from the annular retainer ring 16 than is the outer step 38. The space 46 formed between the inner step 36 and the annular washer 14 permits the washer to have a limited amount of movement toward the base 12. The central opening 48 of the annular retainer ring 16 also permits the washer 14 to have limited movement outward away from the base 12. Thus, the washer 14 is provided with limited, bi-directional movement in the longitudinal direction.

Figure 6:
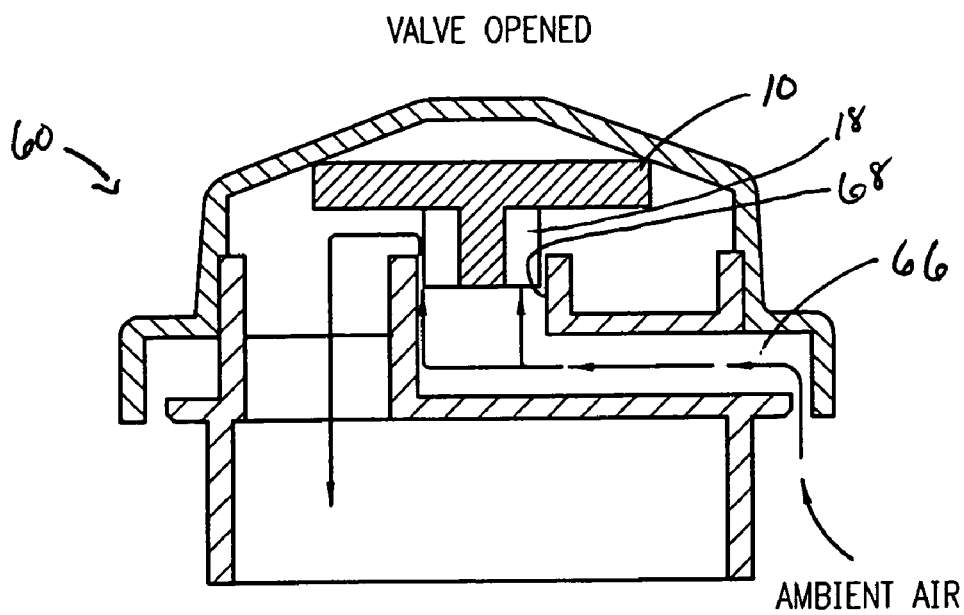
FIG. 6 is a cross-sectional view of an air admittance vent with the diaphragm assembly shown in the open position.
Figure 7:
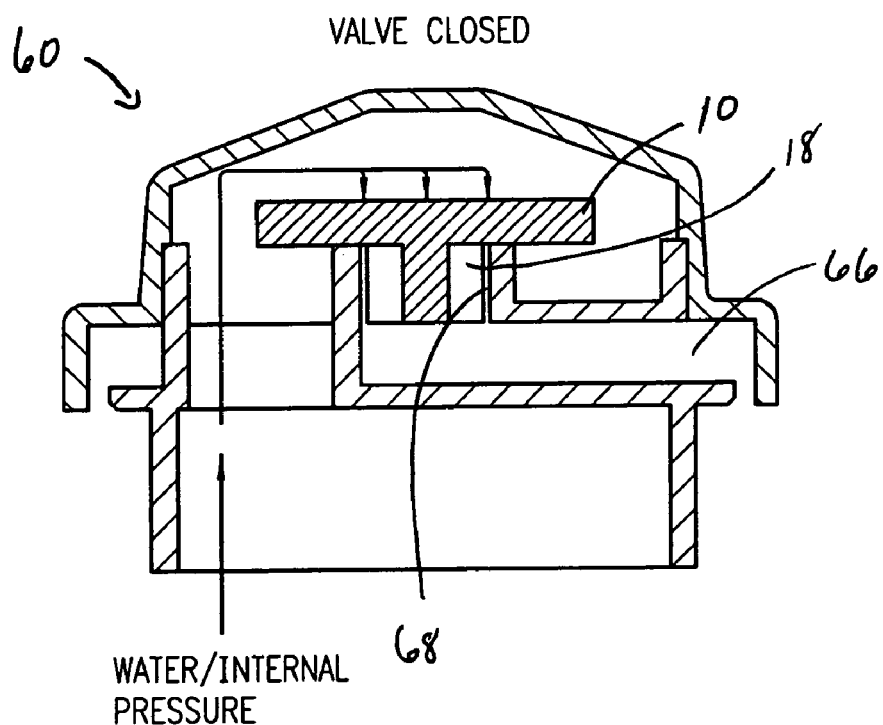
FIG. 7 is a cross-sectional view of an air admittance vent with the diaphragm assembly shown in the closed position.

Referring to FIGS. 6 & 7, a diaphragm assembly 10 is schematically shown as part of an air admittance vent 60. The air admittance vent includes a cap 62 and a base 64. The base 64 connects to the PDWS (not shown) and includes a channel 66 through which ambient air is allowed to enter the PDWS. The diaphragm assembly 10 rests on the base 64 with the stem 18 in the air admittance vent opening 68.

In FIG. 6, the diaphragm assembly 10 is shown in the open position, while in FIG. 7 the diaphragm assembly 10 is shown in the closed position. When in the open position, the diaphragm assembly 10 allows ambient air to enter through the channel 66 and into the PDWS. This occurs when the pressure in the PDWS is less than the pressure in the ambient atmosphere. The diaphragm assembly 10 is caused to be in the closed position when the pressure in the PDWS is greater than the ambient atmospheric pressure. Under such circumstances, the stem 18 is forced down into the air admittance vent opening 68, and the annular washer (14 of FIG. 5) forms a seal with the rim of the air admittance vent opening 68, thus preventing gases and fluids in the PDWS from escaping into the ambient atmosphere around the air admittance vent.

Thus, an air admittance vent diaphragm assembly is disclosed. While an embodiment of this invention has been shown and described, it will be apparent to those skilled in the art that many more modifications are possible without departing from the inventive concepts herein. The invention, therefore, is not to be restricted except in the spirit of the following claims.

What is claimed is:

1. An air admittance vent diaphragm assembly comprising:
   a base having an annular portion and a stem extending orthogonally from a center of the annular portion;
   an annular retainer ring having a circumferential skirt, wherein the circumferential skirt engages the base about an outer perimeter of the annular portion and the stem extends beyond the annular retainer ring; and
   an annular malleable washer disposed between the annular retainer ring and the annular portion;
   wherein the annular portion includes a stepped surface; and
   wherein the stepped surface includes an outer step and an inner step, the outer step being disposed nearer to the annular retainer ring than the inner step.

2. The diaphragm assembly of claim 1, wherein the stem has a substantially X-shaped cross section.

3. The diaphragm assembly of claim 1, wherein the outer perimeter includes a beveled edge.

4. The diaphragm assembly of claim 3, wherein the circumferential skirt includes a lip and the lip engages the beveled edge.

5. The diaphragm assembly of claim 1, wherein the annular portion includes a first circumferential ridge and a side of the annular retainer ring facing the annular portion includes a second circumferential ridge.

6. The diaphragm assembly of claim 5, wherein the first and second circumferential ridges have different radii.

7. The diaphragm assembly of claim 1, wherein the base and the annular retainer ring, in combination, include means for the outer perimeter of the annular portion and the circumferential skirt of the annular retainer ring to mutually engage.

8. The diaphragm assembly of claim 1, wherein the base includes means for providing the washer with space for limited bi-directional longitudinal movement.

9. The diaphragm assembly of claim 1, wherein the base and the annular retainer ring, in combination, include means for providing an airtight seal between the base, the annular retainer ring, and the annular malleable washer.

10. The diaphragm assembly of claim 1, wherein the stem has a lateral cross sectional shape adapted to increase airflow through an air admittance vent opening while maximizing an effective circumference of the stem within the air admittance vent opening.

11. The diaphragm assembly of claim 1, wherein the base includes means for providing the washer with space for limited bi-directional longitudinal movement.

12. The diaphragm assembly of claim 1, wherein the stem has a lateral cross sectional shape adapted to increase airflow through an air admittance vent opening while maximizing an effective circumference of the stem within the air admittance vent opening.

13. An air admittance vent diaphragm assembly comprising:
- a base having an annular portion and a stem extending orthogonally from a center of the annular portion, the stem having a substantially X-shaped cross section, wherein an outer perimeter of the annular portion includes a beveled edge;
- an annular retainer ring having a circumferential skirt, wherein the circumferential skirt engages the base about an outer perimeter of the annular portion and the stem extends beyond the annular retainer ring; and
- an annular malleable washer disposed between the annular retainer ring and the annular portion.

14. An air admittance vent diaphragm assembly comprising:
- a base having an annular portion and a stem extending orthogonally from a center of the annular portion, the annular portion including a first circumferential ridge and having a stepped surface;
- an annular retainer ring having a circumferential skirt, wherein the circumferential skirt engages the base about an outer perimeter of the annular portion and the stem extends beyond the annular retainer ring, and wherein a side of the annular retainer ring facing the annular portion includes a second circumferential ridge; and
- an annular malleable washer disposed between the annular retainer ring and the annular portion.

15. The diaphragm assembly of claim 14, wherein the first and second circumferential ridges have different radii.

16. The diaphragm assembly of claim 14, wherein the stepped surface includes an outer step and an inner step, the outer step being disposed nearer to the annular retainer ring than the inner step.

17. An air admittance vent diaphragm assembly comprising:
- a base having an annular portion and a stem extending orthogonally from a center of the annular portion, the stem having a substantially X-shaped cross section, and the annular portion includes a first circumferential ridge and has a stepped surface;
- an annular retainer ring having a circumferential skirt, the stem extending beyond the annular retainer ring, wherein a side of the annular retainer ring facing the annular portion includes a second circumferential ridge, the first and second circumferential ridges having different radii, and wherein the stepped surface includes an outer step and an inner step, the outer step being disposed nearer to the annular retainer ring than the inner step; and
- an annular malleable washer disposed between the annular retainer ring and the annular portion.

18. The diaphragm assembly of claim 17, wherein an outer perimeter of the annular portion includes a beveled edge; and wherein the circumferential skirt comprises a lip, the lip engaging the beveled edge.

19. An air admittance vent diaphragm assembly comprising:
- a base having an annular portion and a stem extending orthogonally from a center of the annular portion;
- an annular retainer ring having a circumferential skirt engaged with an outer perimeter of the annular portion, the stem extending beyond the annular retainer ring,
- wherein the base and the annular retainer ring, in combination, include means for the outer perimeter of the annular portion and the circumferential skirt of the annular retainer ring to mutually engage; and
- an annular malleable washer disposed between the annular retainer ring and the annular portion;
- wherein the base and the annular retainer ring, in combination, include means for providing an airtight seal between the base, the annular retainer ring, and the annular malleable washer;
- wherein the annular portion includes a stepped surface; and
- wherein the stepped surface includes an outer step and an inner step, the outer step being disposed nearer to the annular retainer ring than the inner step.

20. An air admittance vent diaphragm assembly comprising:
- a base having an annular portion and a stem extending orthogonally from a center of the annular portion, the stem having a lateral cross-sectional shape adapted to increase airflow through an air admittance vent opening while maximizing an effective circumference of the stem within the air admittance vent opening;
- an annular retainer ring having a circumferential skirt engaged with an outer perimeter of the annular portion, the stem extending beyond the annular retainer ring; and
- an annular malleable washer disposed between the annular retainer ring and the annular portion;
- wherein the base includes means for providing the washer with space for limited bi-directional longitudinal movement;
- wherein the annular portion includes a stepped surface; and
- wherein the stepped surface includes an outer step and an inner step, the outer step being disposed nearer to the annular retainer ring than the inner step.

* * * * *